US011245180B2

(12) United States Patent
Hamdy et al.

(10) Patent No.: US 11,245,180 B2
(45) Date of Patent: Feb. 8, 2022

(54) BASE STATION ANTENNA UNIFIED SYSTEM FOR SENSORS AND TEST CALLS

(71) Applicant: CommScope Technologies LLC, Hickory, NC (US)

(72) Inventors: Mohamed Nadder Hamdy, Dubai (AE); Ray Butler, Allen, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 643 days.

(21) Appl. No.: 16/095,843

(22) PCT Filed: Apr. 28, 2017

(86) PCT No.: PCT/US2017/030043
§ 371 (c)(1),
(2) Date: Oct. 23, 2018

(87) PCT Pub. No.: WO2017/189954
PCT Pub. Date: Nov. 2, 2017

(65) Prior Publication Data
US 2021/0226322 A1 Jul. 22, 2021

Related U.S. Application Data

(60) Provisional application No. 62/329,426, filed on Apr. 29, 2016.

(51) Int. Cl.
*H01Q 1/24* (2006.01)
*H04B 17/12* (2015.01)
(Continued)

(52) U.S. Cl.
CPC ............ *H01Q 1/246* (2013.01); *H04B 7/026* (2013.01); *H04B 7/15571* (2013.01); *H04B 17/12* (2015.01)

(58) Field of Classification Search
CPC .... H01Q 1/246; H04B 7/15571; H04B 17/12; H04B 7/026
(Continued)

(56) References Cited

U.S. PATENT DOCUMENTS 6,640,111 B1 * 10/2003 Shapira ............... H01Q 1/246
455/562.1
2002/0177460 A1 11/2002 Beasley
(Continued)

FOREIGN PATENT DOCUMENTS

| CN | 101427418 A | 5/2009 |
| CN | 103281713 A | 9/2013 |
| WO | 2003015318 | 2/2003 |

OTHER PUBLICATIONS

PCT International Search Report dated Aug. 1, 2017 for corresponding International Application No. PCT/US2017/030043 (2 pages).
(Continued)

*Primary Examiner* — Tanmay K Shah
(74) *Attorney, Agent, or Firm* — Myers Bigel, P.A.

(57) ABSTRACT

New base station antenna systems may detect service affecting environmental changes, integrate to standardized computing platform and cellular wireless modem, transform BSA into an independent communications hub and generate test calls, reducing drive tests. A BSA includes a panel that includes a ground plane, at least a first array that includes multiple radiating elements, at least one sensor that is configured to sense an environmental condition corresponding to the base station antenna and to generate an environmental condition signal that corresponds to the environmental condition, a circuit device that includes a communication interface that is communicatively coupled to the at least one sensor and that is operable to receive the environmental condition signal from the at least one sensor, and a wireless transmitter that is communicatively coupled to the circuit device and that is operable to transmit message data corresponding to the environmental condition signal to a remote receiver.

18 Claims, 7 Drawing Sheets

(51) Int. Cl.
*H04B 7/026* (2017.01)
*H04B 7/155* (2006.01)

(58) Field of Classification Search
USPC .......................................... 343/702
See application file for complete search history.

(56) References Cited

U.S. PATENT DOCUMENTS

| | | |
|---|---|---|
| 2006/0244675 A1 | 11/2006 | Elliot et al. |
| 2011/0263250 A1 | 10/2011 | Mueck |
| 2013/0130734 A1 | 5/2013 | Rice |
| 2015/0237537 A1 | 8/2015 | Stimpson |
| 2016/0329632 A1* | 11/2016 | Caratelli .................. H01Q 1/48 |

OTHER PUBLICATIONS

PCT International Written Opinion dated Aug. 1, 2017 for corresponding International Application No. PCT/US2017/030043 (11 pages).

Chinese Office Action corresponding to CN 201780026350.7; dated Sep. 3, 2020 (24 pages, including English translation).

PCT International Preliminary Report on Patentability dated Nov. 8, 2018 for corresponding International Application No. PCT/US2017/030043 (13 pages).

\* cited by examiner

BASE STATION ANTENNA UNIFIED SYSTEM FOR SENSORS AND TEST CALLS

CROSS-REFERENCE TO RELATED APPLICATIONS

This application is a 35 U.S.C. § 371 national stage application of PCT Application No. PCT/US2017/030043, filed on Apr. 28, 2017, which itself claims priority to U.S. Provisional Patent Application Ser. No. 62/329,426, filed Apr. 29, 2016, the entire contents of the applications are incorporated by reference herein as if set forth in their entireties. The above-referenced PCT Application was published in the English language as International Publication No. WO 2017/189954 A1 on Nov. 2, 2017.

FIELD OF THE INVENTION

The present invention relates generally to communications systems and, more particularly, to base station antennas for wireless mobile communications networks.

BACKGROUND

Wireless mobile communication networks continue to evolve based on the increased traffic demands on the networks, the expanded coverage areas for service and the new systems being deployed. Cellular ("wireless") communications networks rely on a network of base station antennas (BSA) for connecting cellular devices, such as cellular telephones, to the wireless network. The BSA is the last element in a Radio Frequency (RF) path before transmission. This makes it an ideal location for placing sensors and test calls devices for measuring the overall RF path performance. For example, various attributes of a BSA may be installation specific and may be adjusted and/or optimized based on environmental conditions that exist at the time the BSA is installed and/or serviced. Such environmental conditions may include the presence and/or absence of structures that may block one or more lobes of an antenna's coverage pattern, weather conditions that may affect the BSA, structures that support the BSA and/or failure of RF path components and/or auxiliary components. Additionally, other attributes of a BSA may undesirably change after an installation and/or service. For example, one or more BSA's or other components may degrade in performance in a manner that adversely affects BSA performance.

SUMMARY

Some embodiments of the present invention are directed to a base station antenna that includes a panel that includes a ground plane, at least a first array that includes a first plurality of radiating elements, at least one sensor that is configured to sense an environmental condition corresponding to the base station antenna and to generate an environmental condition signal that corresponds to the environmental condition, a circuit device that includes a communication interface that is communicatively coupled to the at least one sensor and that is operable to receive the environmental condition signal from the at least one sensor, and a wireless transmitter that is communicatively coupled to the circuit device and that is operable to transmit message data corresponding to the environmental condition signal to a receiver that is remote from the base station antenna.

Some embodiments provide that the circuit device is a printed circuit board with a microprocessor and memory.

In some embodiments, the base station antenna comprises a first base station antenna, the circuit device comprises a first circuit device, and the first circuit device comprises a peer communication interface that is operable to provide communications between a second circuit device that is in a second base station antenna and that includes a communication interface that is communicatively coupled to another at least one sensor corresponding to the second base station antenna and that is operable to receive another environmental condition signal from the another at least one sensor.

Some embodiments provide that the first circuit device and the second circuit device each include a mode selection input that may receive instructions regarding whether the first circuit device and the second circuit device operate in a master mode, a slave mode or a peer mode. In some embodiments, the first circuit device in the first base station antenna is configured to operate in a master mode and the second circuit device in the second base station antenna is configured to operate in a slave mode relative to the first circuit device, the second circuit device is configured to communicate message data corresponding to the environmental condition signal corresponding to the second base station antenna to the first circuit device, and the wireless transmitter is communicatively coupled to the first circuit device and is operable to transmit message data corresponding to the environmental condition signals corresponding to the first base station antenna and the second base station antenna to the receiver.

Some embodiments provide that the memory stores instructions that are executed using the microprocessor and data that includes environmental condition threshold data that identifies threshold values corresponding to the environmental condition. In some embodiments, the microprocessor is configured to compare the received environmental condition signal and the environmental condition threshold data, and, responsive to comparing the received environmental condition signal and the environmental condition threshold data, generate a message that is based on the comparison, and the wireless transmitter is configured to transmit the message that is generated to the receiver that is remote from the base station antenna.

In some embodiments, the at least one sensor comprises a distance sensor that is configured to sense a distance between the base station antenna and a nearest structure that is in a beam pattern of the base station antenna. Some embodiments provide that the distance sensor comprises an optical distance sensor and/or an ultrasonic distance sensor, the environmental condition signal comprises a distance value to the nearest structure that is in the beam pattern of the base station antenna, and the wireless transmitter transmits message data corresponding to the distance value to the receiver that is remote from the base station antenna.

In some embodiments, the at least one sensor comprises a power sensor that is configured to sense a radio frequency (RF) input power level corresponding to the base station antenna, the environmental condition signal comprises an RF input power value, and the wireless transmitter transmits message data corresponding to the RF input power value to the receiver that is remote from the base station antenna.

Some embodiments include at least one housing structure that includes an internal cavity. In some embodiments, the ground plane and the first array that includes the first plurality of radiating elements are mounted within the internal cavity, the at least one sensor comprises a moisture sensor that is configured to sense a moisture level in the internal cavity, the environmental condition signal comprises a moisture value, and the wireless transmitter transmits message data corresponding to the moisture value to the receiver that is remote from the base station antenna.

In some embodiments, the wireless transmitter comprises a cellular modem that is on the circuit device and that is operable to transmit message data corresponding to the environmental condition signal using cellular communications to a cellular receiver that is remote from the base station antenna. Some embodiments provide that the cellular modem is embedded in the circuit device and is operable responsive to instructions and data that is stored on a removable memory device.

Some embodiments include a plurality of electrical connectors that are configured to receive cable connections from other base station antennas and/or externally located sensors.

In some embodiments, the communication interface is further configured to be communicatively coupled to a plurality of environmental condition sensors and is operable to receive different environmental condition signals from respective ones of the plurality of environmental condition sensors.

Some embodiments of the present invention are directed to methods of monitoring conditions corresponding to a base station antenna. Methods may include generating at least one environmental condition signal that corresponds to an environmental condition of a base station antenna, receiving, into a circuit device that includes a microprocessor and a memory, the at least one environmental condition signal that corresponds to the environmental condition of the base station antenna, comparing, within the circuit device, the received at least one environmental condition signal to an environmental condition threshold value, responsive to the comparing, generating a message that corresponds to the at least one environmental condition signal and the environmental condition threshold value, and transmitting the message that corresponds to the at least one environmental condition signal and the environmental condition threshold value to a receiver that is remote from the base station antenna.

In some embodiments, generating the at least one environmental condition signal comprises generating at least one of a distance value corresponding to a distance between the base station antenna and a nearest structure that is in a beam pattern of the base station antenna, a radio frequency (RF) input power value corresponding to the base station antenna, and a moisture value that corresponds to a moisture content an internal cavity of the base station antenna.

Some embodiments provide that the base station antenna comprises a first base station antenna, and the at least one environmental condition signal comprises a first environmental condition signal. Methods may further include receiving, into the circuit device, a second environmental condition signal that corresponds to an environmental condition of a second base station antenna, and transmitting the message comprises transmitting a message that corresponds to the first environmental condition signal and the second environmental condition signal to the receiver that is remote from the first and second base station antennas.

Some embodiments of the present invention are directed to a base station antenna monitoring device that includes a housing that defines an internal cavity and that is configured to be mounted on a base station antenna, at least one sensor that is configured to sense an environmental condition corresponding to the base station antenna and to generate an environmental condition signal that corresponds to the environmental condition, a circuit device that is inside the internal cavity and includes a communication interface that is communicatively coupled to the at least one sensor and that is operable to receive the environmental condition signal from the at least one sensor, and a wireless transmitter that is inside the internal cavity and that is communicatively coupled to the circuit device and that is operable to transmit message data corresponding to the environmental condition signal to a receiver that is remote from the base station antenna.

In some embodiments, the at least one sensor comprises a plurality of sensors that are configured to sense environmental conditions corresponding to a plurality of base station antennas, the communication interface is communicatively coupled to the plurality of sensors and is operable to receive environmental condition signals corresponding to the plurality of base station antennas, and the wireless transmitter is operable to transmit message data corresponding to the environmental condition signals.

Some embodiments of the present invention utilize the built in data modem and microprocessor board/credit card sized computer to generate VoLTE test calls and/or test data sessions to reduce dependencies on physical drive tests.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

The Base Station Antenna (BSA) is the last element in a Radio Frequency (RF) path before transmission to cellular devices, such as cellular phones. This makes it an ideal location for placing sensors, measuring the overall RF path performance. Some embodiments provide that systems that can host a test call generating device that is operable to perform call tests that might otherwise be addressed by sending costly drive test teams. The BSA may have various installation and/or environmental condition specific attributes that need sensors to be adjusted and/or optimized based on environmental conditions. Such environmental conditions may include the presence and/or absence of structures that may block one or more lobes of the antenna's coverage pattern, weather conditions that may affect the BSA, structures that support the BSA, and/or failure or degradation of RF path components and/or auxiliary components leading to signal weakening. Additionally, other attributes and/or components of a BSA may undesirably change after installation and/or service, adversely affecting the BSA performance. Such components may include structural, scaling, and/or housing components that may fail in a manner that allows water leakage and/or the introduction of other foreign matter.

Currently, few external sensors exist such as azimuth meters in addition to basic configuration tools such as remote electrical tilt. However these tools may be generally available in isolation and lack coordination relative to one another. Additionally, such tools have generally been limited to sending data over, for example, Antenna Interface Standards Group (AISG), which is based on the outdated RS485 protocols. Further, such tools may each provide separate and distinct processors and/or communication interfaces, which may undesirably drive up the cost of using multiple different ones of these tools.

As provided herein, some embodiments according to the present invention may include a unified circuit device such as a unified microprocessor control board. Some embodiments provide that the unified microprocessor control board may be a printed circuit board (PCB) that includes a processor, a memory and one or more communication interfaces. The PCB may be included in and/or on a BSA according to some embodiments herein. For example, reference is now made to FIG. 1, which is a schematic block diagram of a base station antenna according to some embodiments of the present invention. As illustrated, the BSA 100 may include a ground plane 102 and at least one array 104 of multiple radiating elements. The BSA 100 may include at least one sensor 110 that may sense an environmental condition corresponding to the BSA 100. The sensor 110 may generate an environmental condition signal that corresponds to the environmental condition. Some embodiments provide that sensors 110 may be inside the BSA 100, on the BSA 100 and/or separate from the BSA 100. In embodiments in which a sensor 110 is separate from the BSA 100, the sensor 110 may be coupled to the BSA 100 using one or more electrical cables 114 that may be coupled to the BSA 100 via one or more electrical connectors 140.

Figure 1:
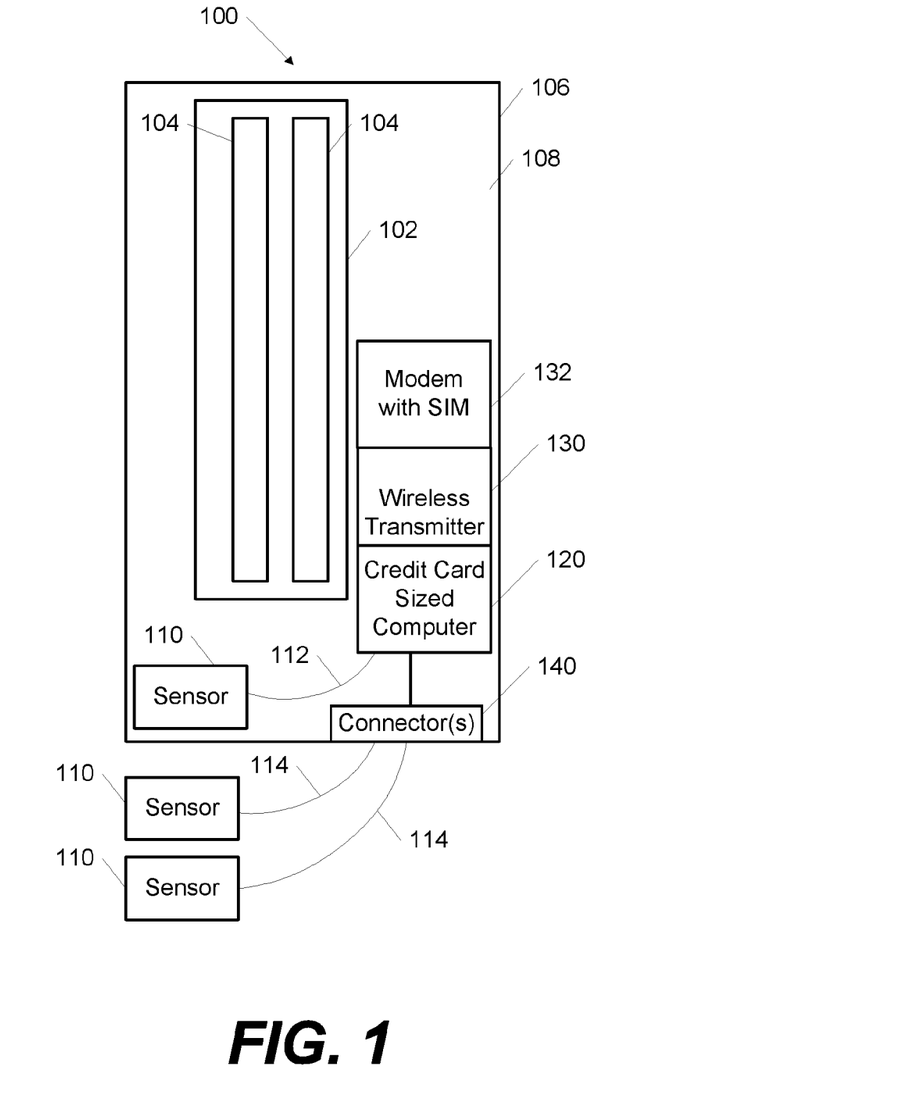
FIG. 1 is a schematic block diagram of a base station antenna according to some embodiments of the present invention.

The BSA 100 may include a circuit device (e.g., microprocessor controller, credit card sized computer, or PCB) 120 that includes a communication interface 126 (illustrated in FIGS. 2 and 5) that is communicatively coupled to one or more of the sensors 110. Some embodiments provide that the controller can be based on recent credit card sized computers, such as the Raspberry pi, Intel Galileo, and/or Arduino Uno, among others. Some embodiments provide that the controller (computer) and communications interface (modem) can be used for generating test calls utilizing a standard and/or specifically developed drive test software.

Figure 2:
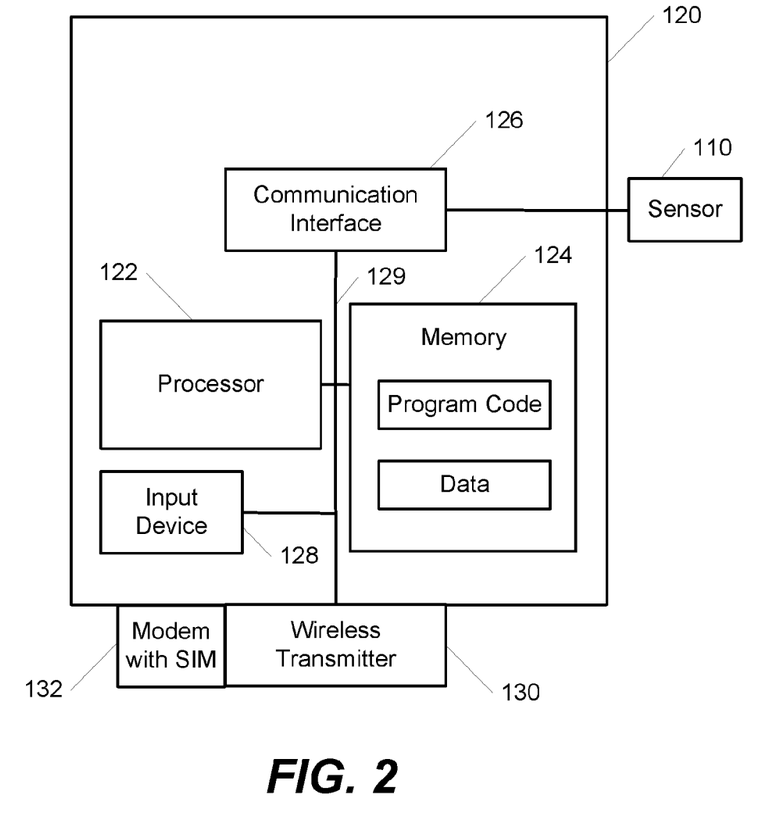
FIG. 2 is a schematic block diagram of a circuit device that may include a microprocessor kit in a base station antenna according to some embodiments of the present invention.

Reference is now made to FIG. 2, which is a schematic block diagram of a circuit device 120 in a base station antenna according to some embodiments of the present invention. The circuit device 120 includes processor circuitry ("processor") 122, and memory 124 containing program code. The processor 122 may include one or more data processing circuits, such as a general purpose and/or special purpose processor (e.g., microprocessor and/or digital signal processor). The processor 122 is configured to execute program code in the memory 124, which may also be described as a computer readable storage medium, to perform some or all of the operations and methods that are described herein for one or more of the embodiments. The memory 124 is representative of the one or more memory devices containing the software and data used for providing a unified circuit device in accordance with some embodiments of the inventive subject matter. The memory 124 may include, but is not limited to, the following types of devices: cache, ROM, PROM, EPROM, EEPROM, flash, SRAM, and DRAM. In some embodiments, the memory 124 may be a fixed memory that is integral to the circuit device 120 while other embodiments provide that the memory 124 is a removable memory device, such as a flash memory card, USB memory device, and/or an SSD card, among others.

The circuit device 120 may also include an input device 128, such as a keyboard, touch sensitive display device, mouse, pointer, etc. In some embodiments, the input device 128 may include a removable memory device that includes data and/or program code to be used by the processor 122. Some embodiments provide that the removable memory device and the memory 124 may be implemented using the same hardware.

The circuit device 120 may also include and/or be communicatively coupled to a wireless transmitter 130 that may transmit messages to one or more remote receivers. For example, some embodiments provide that the wireless transmitter 130 is a component that is separate from the circuit device 120 and communicatively coupled thereto. Other embodiments provide that the wireless transmitter 130 is a component of the circuit device 120 and/or is directly received by the circuit device 120. In some embodiments, the wireless transmitter 130 may be a wireless transceiver, such as for example a cellular modem 132 or the like. Some embodiments provide that the cellular modem 132 is on the circuit device 120 and is operable to transmit message data corresponding to the environmental condition signal using cellular communications to a cellular receiver that is remote from the BSA. Some embodiments provide that the cellular modem 132 is embedded in the circuit device 120 and is operable responsive to instructions and data that is stored on a removable memory device. For example, an embedded cellular modem 132 may use a SIM card that provides configuration data for the modem 132.

Although FIG. 2 illustrates hardware/software architectures that may be used according to some embodiments described herein, it will be understood that the present invention is not limited to such a configuration but is intended to encompass any configuration capable of carrying out operations described herein.

The communication interface 126 may include one or more analog and/or digital communication interfaces that may rely on conventional and/or proprietary communication and/or signal interface protocols. Although discussed herein as a PCB, the circuit device 120 may include form factors that are not PCB's and/or may include multiple PCBs that perform the functionality of the circuit device 120. Some embodiments provide that the communication interface 126 is communicatively coupled to multiple environmental condition sensors 110 and may receive different environmental condition signals from the different respective ones of these sensors 110.

As discussed above, the circuit device 120 may include a microprocessor 122 and a memory 124. Some embodiments provide that the memory 124 stores program code that includes instructions that may be executed using the microprocessor 122. Additionally, the memory 124 may store data that includes environmental condition threshold data that identifies threshold values corresponding to one or more environmental conditions. For example, in the context of an obstruction distance value, the memory 124 may store a distance value corresponding to the nearest obstruction that may be used by the processor to determine any changes in the obstruction distance. As such, the microprocessor 122 may compare the received environmental condition signal from a sensor 110 and the environmental condition threshold data from the memory 124. In response to the comparison, the microprocessor 122 may generate a message that is based on the comparison. The message may include data corresponding to the environmental condition signal to alert a system operator that an environmental condition may have changed or may indicate performance and/or functional issues corresponding to the BSA 100. Some embodiments provide that the generated message may be sent by the wireless transmitter 130 and/or a modem 132 with a SIM card to a receiver that is remote from the BSA 100.

Some embodiments provide that multiple sensors 110 and/or sensor types may be included. Regardless of the quantity or type, a sensor 110 may be operable to sense an environmental condition corresponding to the base station antenna and to generate an environmental condition signal that corresponds to the sensed environmental condition. Examples of environmental conditions that may be sensed include, obstructions, moisture, temperatures and/or temperature ranges, RF performance, and/or vibration, among others.

Figure 3A:
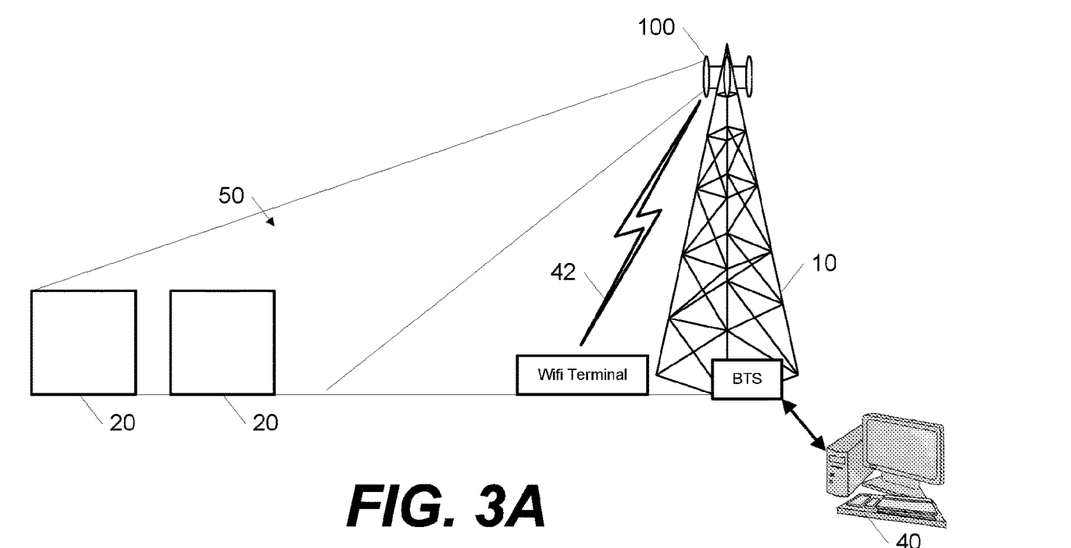
FIGS. 3A and 3B are schematic elevation views of a tower and surrounding structures before and after an obstructing structure is installed, the tower including a base station antenna according to some embodiments of the present invention.

In some embodiments, a sensor 110 may be a distance or proximity sensor that is operable to sense a distance between the BSA 100 and a nearest structure that may affect a beam pattern of the BSA 100. For example, brief reference is now made to FIGS. 3A and 3B, which are schematic elevation views of a tower 10 including a BSA 100 according to some embodiments of the present invention and surrounding structures before and after an obstructing structure is installed, respectively. Referring to FIG. 3A, a tower 10 supports one or more BSA's 100 that include a main lobe 50 that serves existing structures 20 and corresponding areas. As such, the BSA 100 may be adjusted, tuned and/or aimed in accordance with the existing structures 20 that are present when the BSA 100 is installed and/or at a time that is after installation, such as during a modification, maintenance interval and/or repair.

Figure 3B:
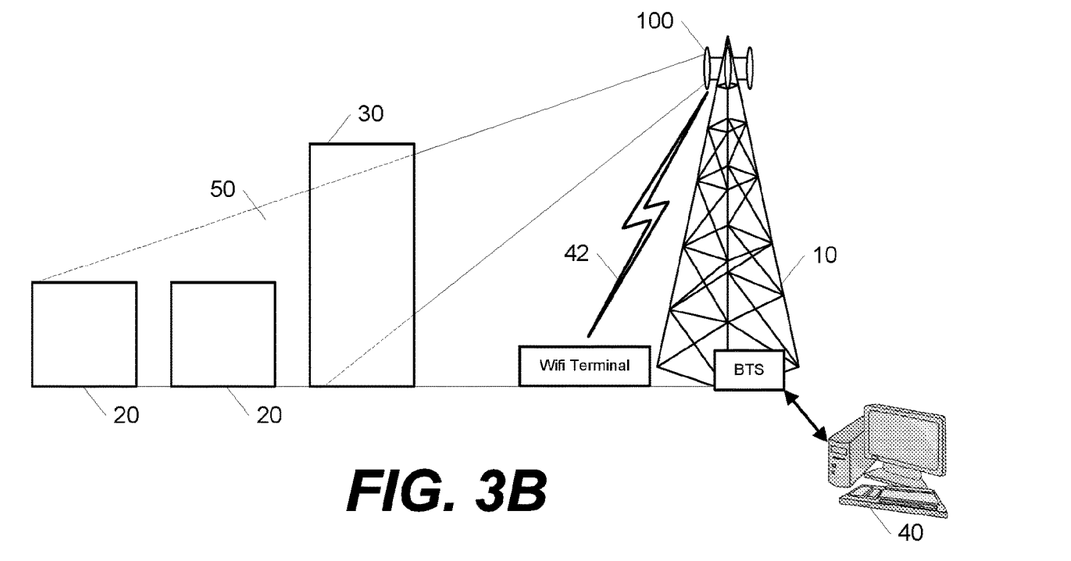

Referring to FIG. 3B, a new structure 30 may be installed at a time that is subsequent to the BSA 100 being adjusted, tuned and/or aimed. As illustrated, the new structure 30 may obscure and/or otherwise interfere with portions of the main lobe 50. The obstruction and/or interference with the main lobe 50 may result in loss in network traffic and thus loss in revenue. While in conventional systems, the addition of a new structure 30 may go unnoticed, a BSA 100 according to embodiments herein may include a distance sensor 110 that senses the distance to the new structure 30. In this manner, an environmental condition signal corresponding to the distance between the base station antenna and a nearest structure (e.g., new structure 30) may be generated.

Some embodiments provide that the distance sensor may be an optical distance sensor and/or an ultrasonic distance sensor. In such embodiments, the environmental condition signal may include a distance value to the nearest structure that is in the beam pattern of the BSA 100. The circuit device 120 may receive the distance value and compare the distance value to a stored distance value threshold and/or to a previous distance value. In the present example, responsive to the comparison, the circuit device 120 may generate a message corresponding to the changed distance value and the message may be transmitted by the wireless transmitter 130 to the receiver 40 that is remote from the BSA 100 via the site's existing cellular network or other local wireless signal 42.

Referring back to FIG. 1, multiple different sensors 110 and/or sensor types may be used to provide environmental condition signal to the circuit device 120. For example, the sensor 110 may include a power sensor that is configured to sense a radio frequency (RF) input power level corresponding to the base station antenna. In such embodiments, the environmental condition signal may include an RF input power value and the wireless transmitter 130 may transmit message data corresponding to the RF input power value to the receiver 40 that is remote from the BSA 100. In this manner, components of the RF path that begin to degrade or fail may be identified quickly. This can include loose connectors, faulty filters and/or a sleeping BTS, among others.

In still other embodiments, the BSA 100 includes a housing structure 106 that includes an internal cavity 108. The ground plane 102 and the first array 104 are mounted within the internal cavity 108. In some embodiments, one or more of the sensors 110 may include a moisture sensor that is configured to sense a moisture level in the internal cavity 108. A changed and/or increased moisture level may indicate water leakage to the internal cavity 108, which may result from broken and/or failing components such as the housing structure 106, a radome, and/or scaling structures that are intended to prevent such leaks.

In some embodiments, the moisture sensor 110 may be external and operable to measure moisture and temperature in the atmosphere surrounding the antenna for smart cities weather monitoring applications. In such embodiments, the environmental condition signal may include a moisture and temperature values. The wireless transmitter 130 may transmit message data to the receiver 40 via the site's cellular network and internet to a centralized location.

Some embodiments provide that other sensors 110 may also provide environmental condition signals to the circuit device 120. For example, vibration sensors 110 may provide environmental condition signals that indicate excess vibration in the tower 10 and/or the BSA 100. Such vibration may be indicative of a failing and/or sub-optimal structural condition and/or severe weather conditions.

As discussed above, different sensors 110 and/or types of sensors may be inside and/or outside of the BSA 100. For example, the internal moisture sensor 110 and/or the power sensor 110 may be inside the BSA 100 and the distance sensor 110 and external temperature sensor may be external to the BSA 100.

In some embodiments, the electrical connectors 140 may receive cable connections from other BSA's 100. For example, reference is now made to FIG. 4, which is a schematic block diagram including multiple base station antennas according to some embodiments of the present invention. As illustrated, only two BSA's 100-A, 100-B that are communicatively coupled are illustrated, however, more than two BSA's may be used according to embodiments herein. Some embodiments provide that each of the two BSA's 100-A, 100-B may include components therein in accordance with BSA 100 discussed above regarding FIG. 1. As such, the description thereof will not be repeated for brevity.

Figure 4:
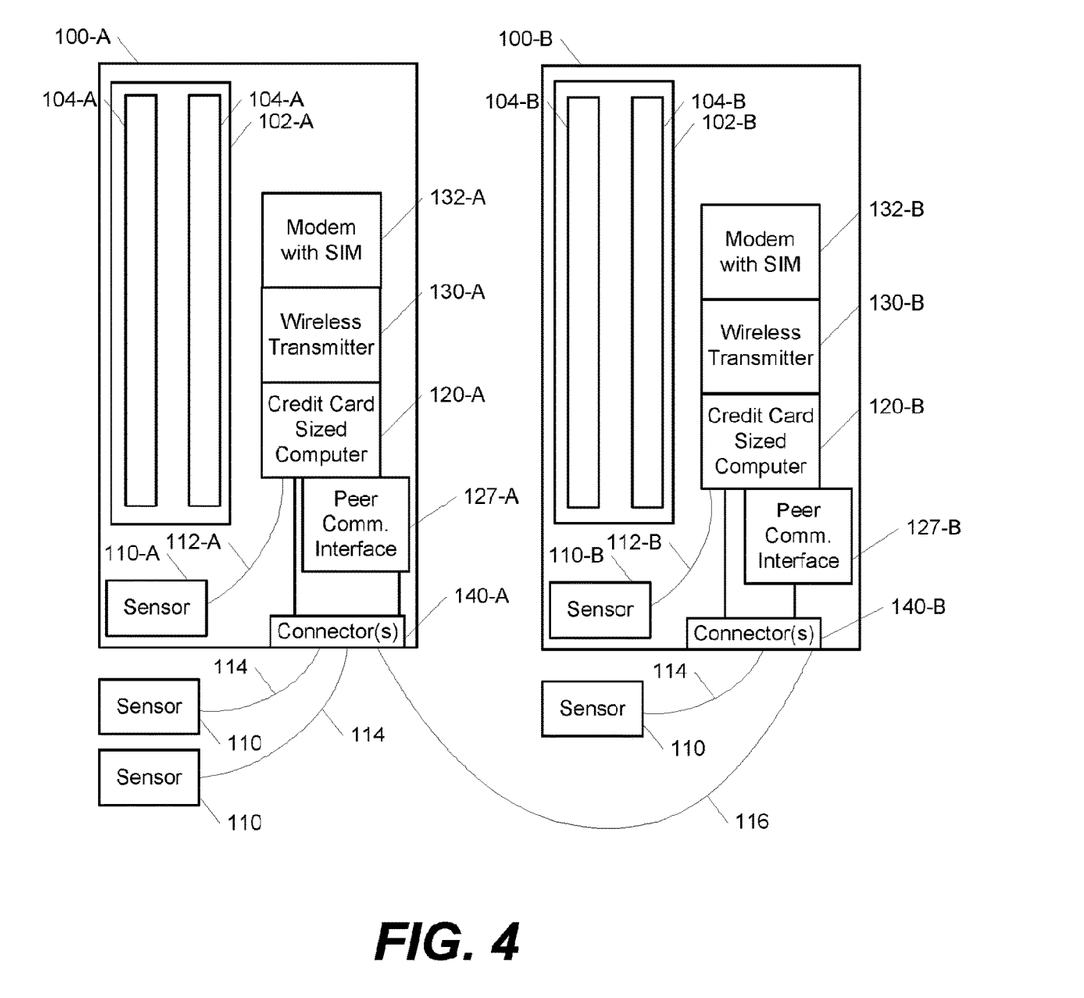
FIG. 4 is a schematic block diagram including multiple base station antennas with separate controllers according to some embodiments of the present invention.

Each of the circuit devices (e.g., PCB's) 120-A, 120-B may receive environmental signals from their respective sensors 110 and may each include a peer communication interface 127-A, 127-B that is operable to provide communications between the first and second circuit devices 120-A, 120-B. The peer communication interfaces 127-A, 127-B may be connected to one another via connectors 140-A, 140-B and by one or more interconnecting cables 116.

In some embodiments, the environmental condition signals from one of the BSA's 100-B may be received by the circuit device 120-A of another BSA 100-A. Interconnection of the circuit devices 120-A, 120-B may provide beneficial functionality in multiple different ways. Some embodiments provide that the first circuit device 120-A and the second circuit device 120-B each include a mode selection input that may receive instructions regarding whether the first circuit device 120-A and the second circuit device 120-B operate in a master mode, a slave mode or a peer mode. Some embodiments provide that a mode selection input may be a hardware input such as a switch and/or jumper setting on the circuit devices 120. In some embodiments, the mode selection input may be provided in the program code and/or the data in a memory of the circuit device 120. For example, if the circuit devices 120-A, 120-B are configured to operate in a peer mode, then the signals and data corresponding to each of the first and second circuit devices 120-A, 120-B may pro ide redundant operation in the event either one of the circuit devices 120 fails.

In some embodiments, in a master/slave mode, the environmental condition signals corresponding to a slave mode (second) circuit device 120-B may be processed by the slave mode (second) circuit device 100-B and/or may be transmitted to the master mode (first) circuit device 120-A for processing by the master mode (first) circuit device 120-A. In this regard, the master mode (first) circuit device 120-A may generate and/or send messages to a remote receiver that include data corresponding to the first and second BSA's 100-A, 100-B. In this manner, while either of the BSA's 100-A, 100-B may include all of the components described herein, some embodiments provide that components such as the wireless transmitter 130 may only be provided in one of multiple different BSA's 100.

Some embodiments provide that the circuit device 120 may be separate from the ISA 100. For example, brief reference is now made to FIG. 5, which is a schematic block diagram illustrating a base station antenna (BSA) monitoring device 165 according to some embodiments of the present invention. Some embodiments provide that a BSA monitoring device 165 may be mounted external to a BSA 100. In some embodiments, a BSA monitoring device 165 includes a housing 170 that defines an internal cavity and that is configured to be mounted on and/or near a BSA 100. The circuit device 120, wireless transmitter 130, sensor(s) 110 and/or connectors 140 may be consistent with those discussed above.

Figure 5:
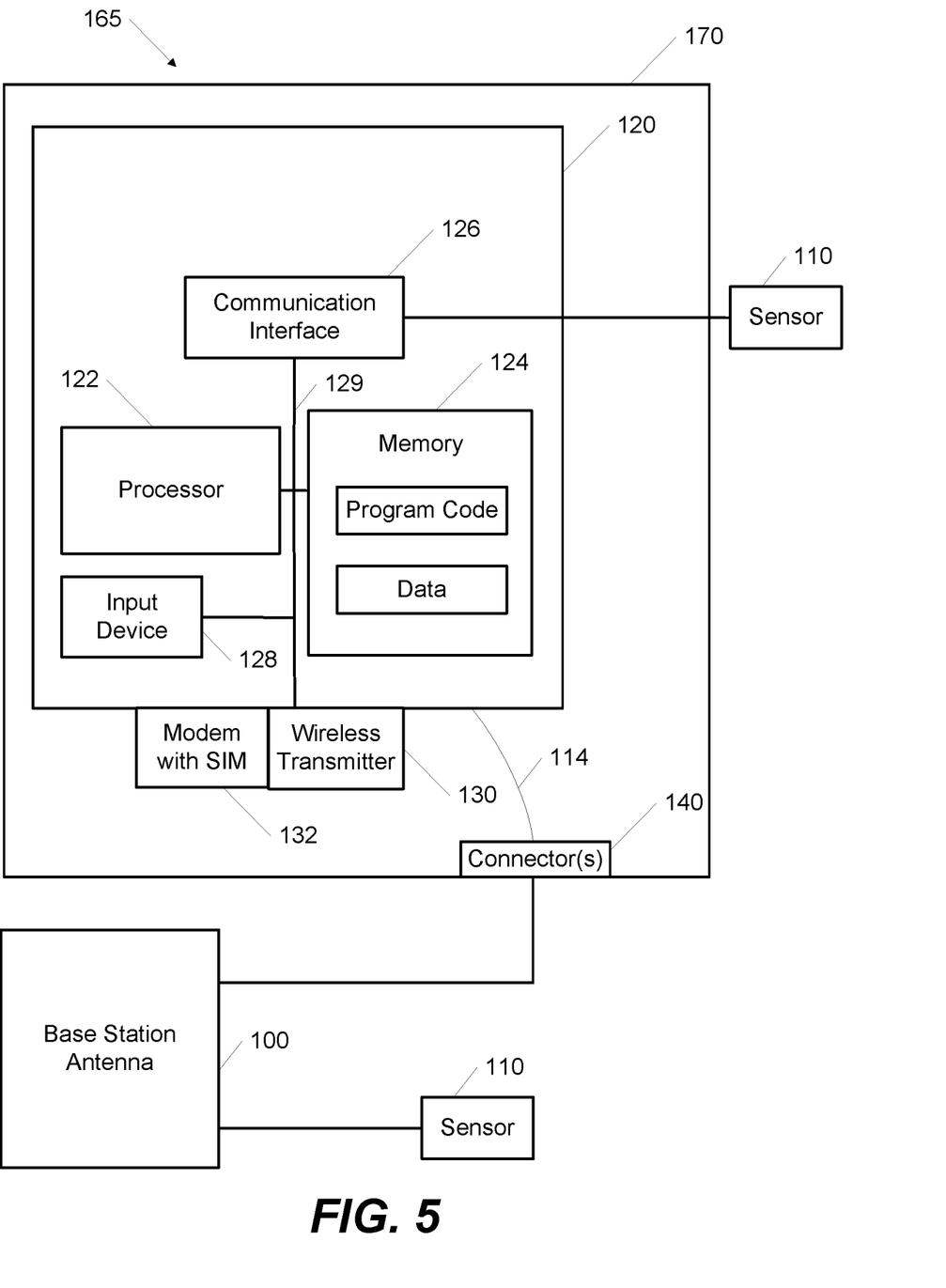
FIG. 5 is a schematic block diagram illustrating a multiple base station antenna monitoring device connected to a single BSA controller according to some embodiments of the present invention.

In some embodiments, the BSA monitoring device 165 is operable to receive environmental condition signals from one or more different BSA's 100 and/or sensors 110 corresponding to the multiple different BSA's 100. Some embodiments provide that BSA's 100 are provided with one or more sensors 110 installed therein and pre-wired to a connector 140 in the respective BSA's 100 and/or to a cable that is configured to penetrate a BSA housing and to be connected to the BSA monitoring device 165.

Figure 6:
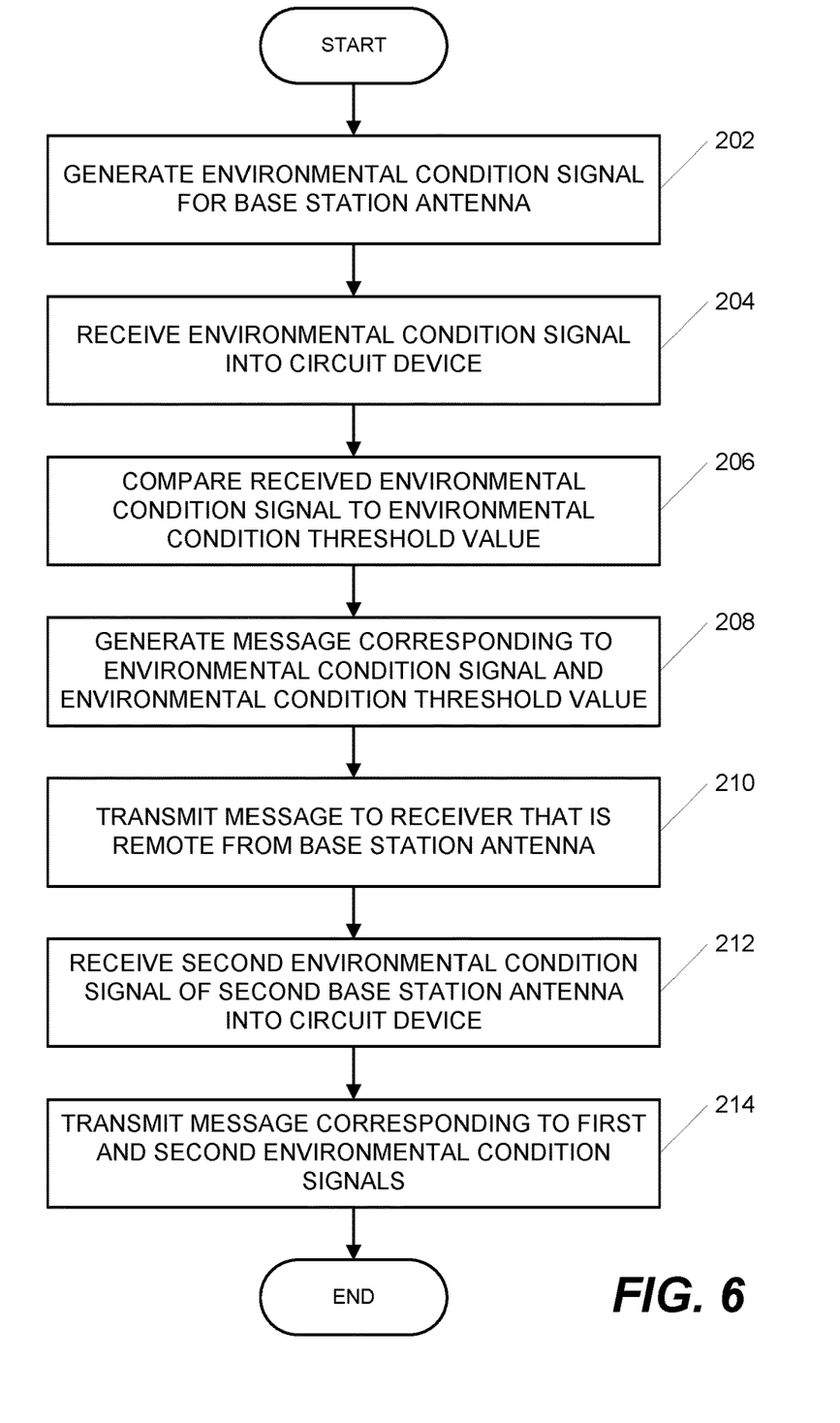
FIG. 6 is a flow chart illustrating operations for methods of monitoring conditions corresponding to a base station antenna according to some embodiments of the present invention.

Reference is now made to FIG. 6, which is a flow chart illustrating operations for methods of monitoring environmental conditions corresponding to a base station antenna according to some embodiments of the present invention. Methods according to some embodiments may include generating at least one environmental condition signal that corresponds to an environmental condition of a BSA 100 (block 202). As described herein, the environmental condition signal may be generated by one or more sensors 110 that may sense, distance, proximity, moisture, temperature, power, and/or vibration, among others. For example, the environmental condition signal may include a distance value corresponding to a distance between the base station antenna and a nearest structure that is in a beam pattern of the BSA 100, a radio frequency (RF) input power value corresponding to the BSA 100, and/or a moisture value that corresponds to a moisture content an internal cavity of the BSA 100.

The at least one environmental condition signal that corresponds to the environmental condition of the BSA 100 is received into a circuit device 120 that includes a microprocessor 122 and a memory 124 (block 204). In some embodiments, the memory may be a fixed memory that is integral to the circuit device 120 while other embodiments provide that the memory 124 is a removable memory device, such as a flash memory card, USB memory device, and/or an SSD card, among others.

Some embodiments provide that the circuit device 120 may compare the received environmental condition signal to an environmental condition threshold value (block 206). In some embodiments, the environmental condition threshold value may be provided as a value corresponding to initial conditions and the comparison thereto may signal a change in performance of the BSA 100. In some embodiments, the environmental condition threshold value may be a fixed value that is determined before or at the time of installation and/or manufacture. For example, in the context of the distance sensor, a newly erected structure that may interfere with and/or obstruct a lobe of the antenna may be detected as soon as the obstruction is present.

In response to the comparison, a message that corresponds to the at least one environmental condition signal and/or the environmental condition threshold value may be generated (block 208). In some embodiments, the message may include data corresponding to the comparison and/or the actual environmental condition signal. Some embodiments provide that the message may include specific content that identifies the nature of the environmental condition either in a text, numerical and/or code form. For example, in the case of a moisture level that exceeds a moisture level threshold, a message may be sent that indicates excess moisture levels, or the like.

The message that corresponds to the at least one environmental condition signal and/or the environmental condition threshold value may be transmitted to a receiver that is remote from the base station antenna. In some embodiments, the receiver may be a dedicated receiver corresponding to the BSA 100 and/or to multiple BSA's. In some embodiments, the receiver corresponds to a BSA operator report line that is configured to receive alert or other types of messages corresponding to equipment operated by that operator.

In some embodiments, a circuit device 120 of a BSA 100 is configured to receive a second environmental condition signal that corresponds to an environmental condition of a second base station antenna (block 212) and to transmit a message that corresponds to the first environmental condition signal and the second environmental condition signal to the remote receiver (block 214).

Figure 7:
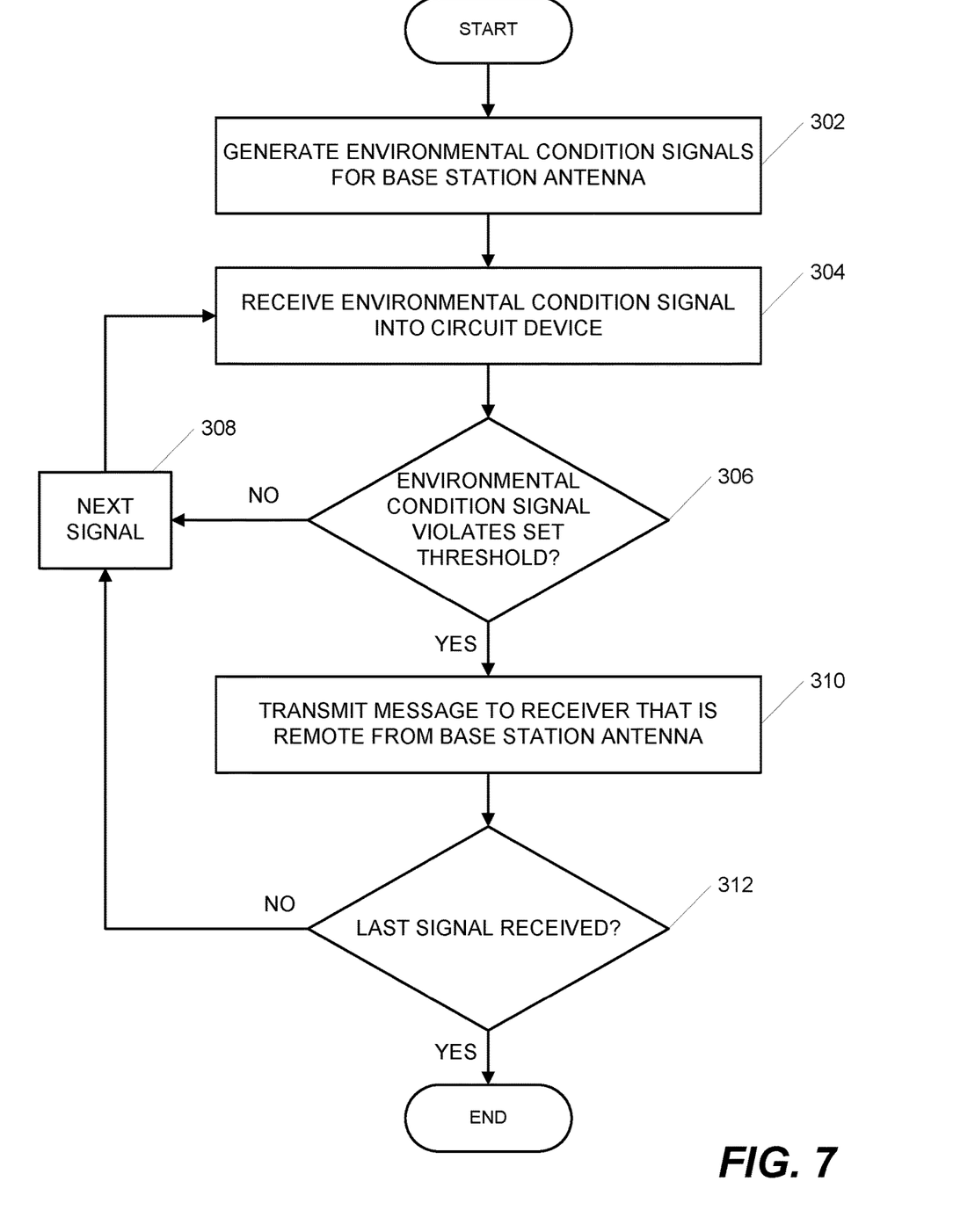
FIG. 7 is a flow chart illustrating operations for methods of monitoring conditions corresponding to a base station antenna according to some other embodiments of the present invention.

Reference is now made to FIG. 7, which is a flow chart illustrating operations for methods of monitoring conditions corresponding to a base station antenna according to some other embodiments of the present invention. Methods according to some embodiments may include generating multiple environmental condition signals that correspond to environmental conditions of multiple BSAs 100 (block 302). As described herein, the environmental condition signal may be generated by one or more sensors 110 that may sense, distance, proximity, moisture, temperature, power, and/or vibration, among others. For example, the environmental condition signal may include a distance value corresponding to a distance between the base station antenna and a nearest structure that is in a beam pattern of the BSA 100, a radio frequency (RF) input power value corresponding to the BSA 100, and/or a moisture value that corresponds to a moisture content an internal cavity of the BSA 100.

An environmental condition signal that corresponds to the environmental condition of a BSA 100 is received into a circuit device 120 that includes a microprocessor 122 and a memory 124 (block 304). In some embodiments, the memory may be a fixed memory that is integral to the circuit device 120 while other embodiments provide that the memory 124 is a removable memory device, such as a flash memory card, USB memory device, and/or an SSD card, among others.

Some embodiments provide that the circuit device 120 may determine whether the environmental condition signal exceeds and/or violates a set threshold value (block 206). In some embodiments, the environmental condition threshold value may be provided as a value corresponding to initial conditions and the comparison thereto may signal a change in performance of the BSA 100. In some embodiments, the environmental condition threshold value may be a fixed value that is determined before or at the time of installation and/or manufacture. For example, in the context of the distance sensor, a newly erected structure that may interfere with and/or obstruct a lobe of the antenna may be detected as soon as the obstruction is present.

If the environmental condition signal does not exceed and/or violate a set threshold value, then a next signal may be generated, received and/or processed (block 308). If the environmental condition signal does exceed and/or violate the set threshold value, then a message may be transmitted to a receiver that is remote from the BSA 100 (block 310). In some embodiments, the message may include data corresponding to the comparison and/or the actual environmental condition signal. Some embodiments provide that the message may include specific content that identifies the nature of the environmental condition either in a text, numerical and/or code form. For example, in the case of a moisture level that exceeds a moisture level threshold, a message may be sent that indicates excess moisture levels, or the like.

In some embodiments, the circuit device 120 may determine if the environmental condition signal is the last signal received (block 312). If the environmental condition signal is not the last one to be received, then the next signal (block 308) may be generated, received and/or processed. If the environmental condition signal is the last signal received for a given time interval, then the operations may end until next environmental condition signals are generated.

In some embodiments, the circuit device 120 includes a drive test application. Some embodiments provide that the drive test application is operable to control the embedded modem to transmit and receive test VoLTE and/or data sessions in the uplink and downlink directions. In this manner, actual user encountered problems that either can't be identified using the standard system counters or that may only be reported after 1 hour of making changes to the network may be identified and/or investigated.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A base station antenna, comprising:
    a panel that includes a ground plane;
    at least a first array that includes a first plurality of radiating elements;
    at least one sensor that is configured to sense an environmental condition corresponding to the base station antenna and to generate an environmental condition signal that corresponds to the environmental condition;
    a circuit device that includes a communication interface that is communicatively coupled to the at least one sensor and that is operable to receive the environmental condition signal from the at least one sensor; and
    a wireless transmitter that is communicatively coupled to the circuit device and that is operable to transmit message data corresponding to the environmental condition signal to a receiver that is remote from the base station antenna;
    wherein the base station antenna comprises a first base station antenna,
    wherein the circuit device comprises a first circuit device, and
    wherein the first circuit device comprises a peer communication interface that is operable to provide communications between a second circuit device that is in a second base station antenna and that includes a communication interface that is communicatively coupled to another at least one sensor corresponding to the second base station antenna and that is operable to receive another environmental condition signal from the another at least one sensor.

2. The base station antenna according to claim 1, wherein the first circuit device and the second circuit device each include a mode selection input that may receive instructions regarding whether the first circuit device and the second circuit device operate in a master mode, a slave mode or a peer mode.

3. The base station antenna according to claim 2, wherein the first circuit device in the first base station antenna is configured to operate in a master mode and the second circuit device in the second base station antenna is configured to operate in a slave mode relative to the first circuit device, wherein the second circuit device is configured to communicate message data corresponding to the environmental condition signal corresponding to the second base station antenna to the first circuit device, and wherein the wireless transmitter is communicatively coupled to the first circuit device and is operable to transmit message data corresponding to the environmental condition signals corresponding to the first base station antenna and the second base station antenna to the receiver.

4. The base station antenna according to claim 1, wherein the circuit device is a printed circuit board with a microprocessor and memory; and
wherein the memory stores instructions that are executed using the microprocessor and data that includes environmental condition threshold data that identifies threshold values corresponding to the environmental condition.

5. The base station antenna according to claim 4, wherein the microprocessor is configured to compare the received environmental condition signal and the environmental condition threshold data, and, responsive to comparing the received environmental condition signal and the environmental condition threshold data, generate a message that is based on the comparison, and
wherein the wireless transmitter is configured to transmit the message that is generated to the receiver that is remote from the base station antenna.

6. The base station antenna according to claim 1, wherein the at least one sensor comprises a distance sensor that is configured to sense a distance between the base station antenna and a nearest structure that is in a beam pattern of the base station antenna.

7. The base station antenna according to claim 6, wherein the distance sensor comprises an optical distance sensor and/or an ultrasonic distance sensor, wherein the environmental condition signal comprises a distance value to the nearest structure that is in the beam pattern of the base station antenna, and wherein the wireless transmitter transmits message data corresponding to the distance value to the receiver that is remote from the base station antenna.

8. The base station antenna according to claim 1, wherein the at least one sensor comprises a power sensor that is configured to sense a radio frequency (RF) input power level corresponding to the base station antenna,
wherein the environmental condition signal comprises an RF input power value, and
wherein the wireless transmitter transmits message data corresponding to the RF input power value to the receiver that is remote from the base station antenna.

9. The base station antenna according to claim 1, further comprising at least one housing structure that includes an internal cavity,
wherein the ground plane and the first array that includes the first plurality of radiating elements are mounted within the internal cavity,
wherein the at least one sensor comprises a moisture sensor that is configured to sense a moisture level in the internal cavity,
wherein the environmental condition signal comprises a moisture value, and
wherein the wireless transmitter transmits message data corresponding to the moisture value to the receiver that is remote from the base station antenna.

10. The base station antenna according to claim 1, wherein the wireless transmitter comprises a cellular modem that is on the circuit device and that is operable to transmit message data corresponding to the environmental condition signal using cellular communications to a cellular receiver that is remote from the base station antenna.

11. The base station antenna according to claim 10, wherein the cellular modem is operable to generate VoLTE test calls and uplink/downlink data transfer sessions.

12. The base station antenna according to claim 10, wherein the cellular modem is embedded in the circuit device and is operable responsive to instructions and data that is stored on a removable memory device.

13. The base station antenna according to claim 1, further comprising a plurality of electrical connectors that are configured to receive cable connections from other base station antennas and/or externally located sensors.

14. The base station antenna according to claim 1, wherein the communication interface is further configured to be communicatively coupled to a plurality of environmental condition sensors and is operable to receive different environmental condition signals from respective ones of the plurality of environmental condition sensors.

15. A method of monitoring conditions corresponding to a base station antenna, the method comprising:
generating at least one environmental condition signal that corresponds to an environmental condition of a base station antenna;
receiving, into a circuit device that includes a microprocessor and a memory, the at least one environmental condition signal that corresponds to the environmental condition of the base station antenna;
comparing, within the circuit device, the received at least one environmental condition signal to an environmental condition threshold value;
responsive to the comparing, generating a message that corresponds to the at least one environmental condition signal and the environmental condition threshold value; and
transmitting the message that corresponds to the at least one environmental condition signal and the environmental condition threshold value to a receiver that is remote from the base station antenna;
wherein generating the at least one environmental condition signal comprises generating at least one of a distance value corresponding to a distance between the base station antenna and a nearest structure that is in a beam pattern of the base station antenna, a radio frequency (RF) input power value corresponding to the base station antenna, and a moisture value that corresponds to a moisture content an internal cavity of the base station antenna.

16. The method according to claim 15, wherein the base station antenna comprises a first base station antenna, and the at least one environmental condition signal comprises a first environmental condition signal, the method further comprising:

receiving, into the circuit device, a second environmental condition signal that corresponds to an environmental condition of a second base station antenna; and transmitting the message comprises transmitting a message that corresponds to the first environmental condition signal and the second environmental condition signal to the receiver that is remote from the first and second base station antennas.

17. A base station antenna monitoring device comprising:

a housing that defines an internal cavity and that is configured to be mounted on a base station antenna;

at least one sensor that is configured to sense an environmental condition corresponding to the base station antenna and to generate an environmental condition signal that corresponds to the environmental condition;

a circuit device that is inside the internal cavity and includes a communication interface that is communicatively coupled to the at least one sensor and that is operable to receive the environmental condition signal from the at least one sensor; and a wireless transmitter that is inside the internal cavity and that is communicatively coupled to the circuit device and that is operable to transmit message data corresponding to the environmental condition signal to a receiver that is remote from the base station antenna;

wherein generating the environmental condition signal comprises generating a distance value corresponding to a distance between the base station antenna and a nearest structure that is in a beam pattern of the base station antenna, a radio frequency (RF) input power value corresponding to the base station antenna, or a moisture value that corresponds to a moisture content an internal cavity of the base station antenna.

18. The base station antenna monitoring device according to claim 17, wherein the at least one sensor comprises a plurality of sensors that are configured to sense environmental conditions corresponding to a plurality of base station antennas, wherein the communication interface is communicatively coupled to the plurality of sensors and is operable to receive environmental condition signals corresponding to the plurality of base station antennas, and wherein the wireless transmitter is operable to transmit message data corresponding to the environmental condition signals.

* * * * *